(12) United States Patent
Chen et al.

(10) Patent No.: US 12,125,174 B2
(45) Date of Patent: Oct. 22, 2024

(54) IMAGE PROCESSING METHOD AND DEVICE, AND COMPUTER-READABLE STORAGE MEDIUM

(71) Applicant: BOE TECHNOLOGY GROUP CO., LTD., Beijing (CN)

(72) Inventors: Guannan Chen, Beijing (CN); Ran Duan, Beijing (CN); Mengdi Sun, Beijing (CN); Lijie Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 465 days.

(21) Appl. No.: 17/626,162

(22) PCT Filed: Dec. 24, 2020

(86) PCT No.: PCT/CN2020/138903
§ 371 (c)(1),
(2) Date: Jan. 11, 2022

(87) PCT Pub. No.: WO2022/133874
PCT Pub. Date: Jun. 30, 2022

(65) Prior Publication Data
US 2022/0398696 A1 Dec. 15, 2022

(51) Int. Cl.
*G06V 10/77* (2022.01)
*G06T 3/4046* (2024.01)
(Continued)

(52) U.S. Cl.
CPC ............. *G06T 5/70* (2024.01); *G06T 3/4046* (2013.01); *G06T 5/20* (2013.01); *G06T 5/50* (2013.01);
(Continued)

(58) Field of Classification Search
CPC .......... G06T 5/70; G06T 3/4046; G06T 5/20; G06T 5/50; G06T 2207/20028;
(Continued)

(56) References Cited

U.S. PATENT DOCUMENTS

2022/0188595 A1* 6/2022 Chen ................ G06N 3/04

OTHER PUBLICATIONS

Liang et al. "MCFNet: Multi-layer concatenation fusion network for medical images fusion." IEEE Sensors Journal 19.16 (2019): 7107-7119. (Year: 2019).*

* cited by examiner

*Primary Examiner* — Phuoc Tran
(74) *Attorney, Agent, or Firm* — HOUTTEMAN LAW LLC

(57) ABSTRACT

An image processing method and device, and a computer-readable storage medium are disclosed. The method includes: performing a channel expansion process on the input image to obtain a first intermediate image; performing a channel decomposition process for multiple times based on the first intermediate image, wherein each time of channel decomposition process includes: decomposing an image to be processed into a first decomposition image and a second decomposition image; concatenating first decomposition images generated in each time of channel decomposition process and second decomposition image generated in the last time of channel decomposition process to obtain a concatenated image; performing a post-processing process on the concatenated image to obtain a second intermediate image; and fusing the second intermediate image with the input image to obtain the first output image.

14 Claims, 6 Drawing Sheets

(51) Int. Cl.
*G06T 5/20* (2006.01)
*G06T 5/50* (2006.01)
*G06T 5/70* (2024.01)
*G06V 40/16* (2022.01)

(52) U.S. Cl.
CPC ........ *G06V 10/7715* (2022.01); *G06V 40/166* (2022.01); *G06V 40/168* (2022.01); *G06T 2207/20028* (2013.01); *G06T 2207/20081* (2013.01); *G06T 2207/20084* (2013.01); *G06T 2207/20221* (2013.01)

(58) Field of Classification Search
CPC . G06T 2207/20081; G06T 2207/20084; G06T 2207/20221; G06T 5/60; G06T 2207/30201; G06V 10/7715; G06V 40/166; G06V 40/168; G06V 10/255; G06V 10/30; G06V 10/82; G06V 10/454; G06V 40/165; G06N 3/048; G06N 3/09; G06N 3/0464

See application file for complete search history.

IMAGE PROCESSING METHOD AND DEVICE, AND COMPUTER-READABLE STORAGE MEDIUM

TECHNICAL FIELD

The present disclosure relates to the field of image processing technology, and in particular, to an image processing method, an image processing device, and a computer-readable storage medium.

BACKGROUND

In an audio call or video call scene (especially in a scene in which multiple people talk in real time), in order to meet the requirement of real-time, image information is greatly compressed during a video transmission process due to the limitation of transmission bandwidth, therefore a video image has noises due to the compression of the image information, thereby resulting in poor video definition.

SUMMARY

The present disclosure provides an image processing method, an image processing device, and a computer-readable storage medium.

As a first aspect, an image processing method applied to a convolutional neural network is provided. The method includes: processing an input image with a convolutional neural network to obtain a first output image, with definition of the first output image being greater than definition of the input image. Processing the input image with the convolutional neural network to obtain the first output image includes: performing a channel expansion process on the input image to obtain a first intermediate image, with a number of channels of the first intermediate image being greater than a number of channels of the input image; performing a channel decomposition process for multiple times based on the first intermediate image, wherein each time of channel decomposition process includes: decomposing an image to be processed into a first decomposition image and a second decomposition image; a number of channels of the first decomposition image is smaller than a number of channels of the second decomposition image, and a sum of the number of channels of the first decomposition image and the number of channels of the second decomposition image is equal to a number of channels of the image to be processed; an image to be processed for the first time of channel decomposition process is an image obtained by performing the channel expansion process on the first intermediate image; and an image to be processed for each time of channel decomposition process after the first time of channel decomposition process is an image obtained by performing the channel expansion process on the second decomposition image generated in an immediately previous channel decomposition process; concatenating the first decomposition images generated in each time of channel decomposition process and the second decomposition image generated in the last time of channel decomposition process to obtain a concatenated image; performing a post-processing process on the concatenated image to obtain a second intermediate image, with a number of channels of the second intermediate image being the same as the number of channels of the input image; and fusing the second intermediate image with the input image to obtain the first output image.

In some embodiments, performing the channel expansion process on the input image to obtain the first intermediate image includes: performing a feature extraction process on the input image to obtain a third intermediate image, with a number of channels of the third intermediate image being the same as the number of channels of the input image; and performing downsampling and channel expansion processes on the third intermediate image to obtain the first intermediate image, with a size of the first intermediate image being smaller than a size of the third intermediate image and the number of channels of the first intermediate image being greater than the number of channels of the third intermediate image.

In some embodiments, performing the post-processing process on the concatenated image to obtain the second intermediate image includes: assigning weights for channels of the concatenated image; generating a fourth intermediate image according to images of the channels of the concatenated image and corresponding weights, with a number of channels of the fourth intermediate image being the same as a number of channels of the concatenated image; and performing a dimension reduction process on the fourth intermediate image to obtain the second intermediate image, with the number of channels of the second intermediate image being smaller than the number of channels of the fourth intermediate image.

In some embodiments, assigning the weights for the channels of the concatenated image includes: performing a down-sampling process on the concatenated image to obtain a downsampled image; and performing a dimension reduction process on the downsampled image to obtain the weights corresponding to the channels of the concatenated image.

In some embodiments, performing the dimension reduction process on the fourth intermediate image to obtain the second intermediate image includes: performing a first dimension reduction process on the fourth intermediate image to obtain a fifth intermediate image, with a number of channels of the fifth intermediate image being smaller than the number of channels of the fourth intermediate image; performing a second convolution process on the fifth intermediate image to obtain a sixth intermediate image, with a number of channels of the sixth intermediate image being smaller than the number of channels of the fifth intermediate image and the same as the number of channels of the first intermediate image; and performing upsampling and feature dimension reduction processes on the sixth intermediate image to obtain the second intermediate image, with a size of the second intermediate image being greater than a size of the sixth intermediate image and the number of channels of the second intermediate image being smaller than the number of channels of the sixth intermediate image.

In some embodiments, the number of channels of the second decomposition image is 2 to 5 times the number of channels of the first decomposition image.

In some embodiments, the number of channels of the image to be processed in each time of channel decomposition process is the same.

In some embodiments, the image processing method further includes: performing a face detection process on the first output image to obtain a face image; performing a smoothing process on the face image to obtain a smoothed image; and generating a second output image according to the smoothed image and the first output image.

In some embodiments, performing the smoothing process on the face image includes: performing a bilateral filtering process on the face image.

In some embodiments, generating the second output image according to the smoothed image and the first output image includes: performing a weighting and fusion process on the smoothed image and the face image to obtain a fused image; and splicing a portion of the first output image except the face image with the fused image to obtain the second output image.

In some embodiments, performing the face detection process on the first output image includes: performing a multiscale feature extraction process on the first output image to obtain feature extraction images with various sizes; performing a convolution process on each of the feature extraction images to obtain location information and category information of a plurality of detection boxes in the first output image; determining location information of an effective detection box of the plurality of detection boxes according to the category information of the plurality of detection boxes; and determining the face image enclosed by the effective detection box according to the location information of the effective detection box.

In some embodiments, the image processing method further includes: training an initial convolutional network according to multiple sets of sample images and a loss function to obtain the convolution neural network. The loss function includes a Smooth L1 loss function.

As a second aspect, an image processing device is provided. The image processing device includes a memory having a computer program stored therein, and a processor, wherein above image processing method is performed when the computer program is executed by the processor.

As a third aspect, a computer-readable storage medium having a computer program stored therein, wherein the above image processing method is performed when the computer program is executed by a processor.

BRIEF DESCRIPTION OF THE DRAWINGS

The drawings are used to provide a further understanding of the present disclosure, and constitute a part of the specification. The drawings together with the following specific embodiments are used to explain the present disclosure, but do not constitute a limitation on the present disclosure. In the drawings.

DETAILED DESCRIPTION

The specific embodiments of the present disclosure are described in detail below with reference to the drawings. It should be understood that the specific embodiments described herein are only used to illustrate and explain the present disclosure, and are not intended to limit the present disclosure.

Figure 1:
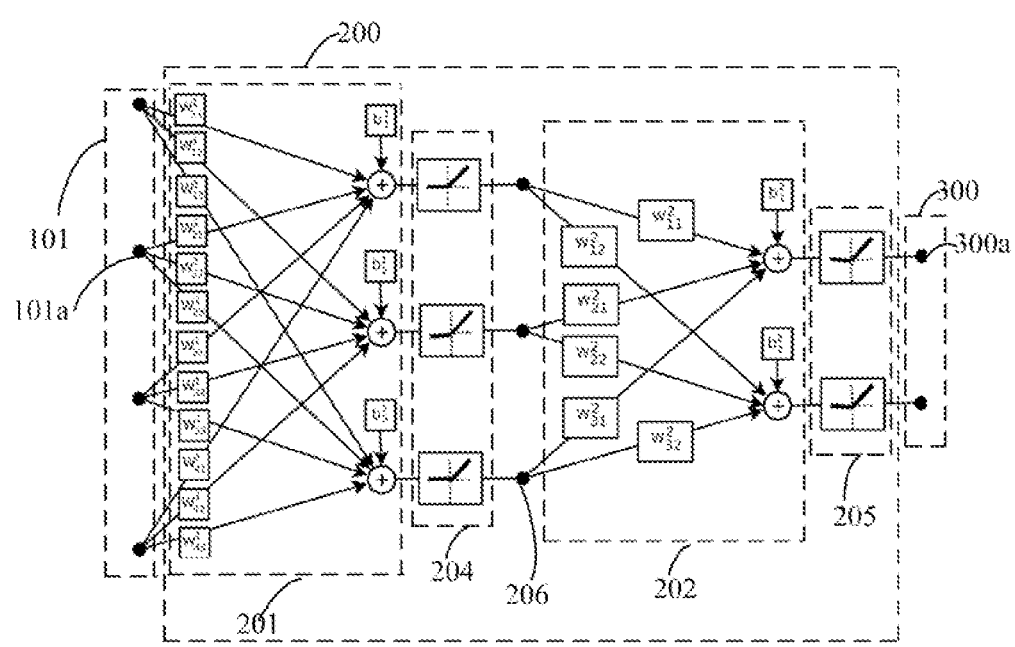
FIG. 1 is a schematic diagram showing a convolutional neural network according to some embodiments of the present disclosure.

The main component of a deep learning system is a convolutional neural network. FIG. 1 is a schematic diagram showing a convolutional neural network according to some embodiments of the present disclosure. As shown in FIG. 1, a convolutional neural network may be applied in the fields including image recognition, face recognition, text recognition, animal recognition, and image processing. For example, when a convolutional neural network processes an image, an input and an output of the convolutional neural network are images. A convolutional kernel of the convolutional neural network replaces a weight of a scalar. In some embodiments, the convolutional neural network shown in FIG. 1 has only three layers. Optionally, the convolutional neural network includes an input layer 101, a hidden layer 200 and an output layer 300. Optionally, four inputs 101a are input into the input layer 101, three outputs 206 are output from the hidden layer 200, and two outputs 300a are output from the output layer 300. Thus, the convolutional neural network can output two output images (e.g., the two outputs 300a). For example, the four inputs 101a which are input into the input layer 101 are four images or four feature maps of one image.

In the embodiments of the present disclosure, the term "convolutional neural network" refers to a deep feedforward artificial neural network. Optionally, the convolutional neural network includes a plurality of convolutional layers, a plurality of upsampling layers, and a plurality of downsampling layers. For example, each of the plurality of convolutional layers may process an image. The upsampling layer and the downsampling layer may change a size of an input image to a size corresponding to a certain convolutional layer.

In the embodiments of the present disclosure, the term "convolutional kernel" refers to a two-dimensional matrix used in a convolution process. Optionally, each of a plurality of items in the two-dimensional matrix has a certain value.

In the embodiments of the present disclosure, the term "convolution" refers to an image processing process. The convolutional kernel is used in the convolution process. Each pixel of an input image has a value, and the convolutional kernel begins from one pixel of the input image and moves to all the pixels of the input image in sequence. At each position of the convolutional kernel, the convolutional kernel overlaps several pixels of the image based on a size of the convolutional kernel. At a position of the convolutional kernel, a value of one of the several overlapping pixels is multiplied by a corresponding value of the convolutional kernel to obtain a product of the one of the several overlapping pixels. Subsequently, all products of the several overlapping pixels are added together to obtain a sum corresponding to the position of the convolutional kernel on the input image. All sums corresponding to all the positions of the convolutional kernel are collected and output by moving the convolutional kernel to all the pixels of the input image, so as to generate an output image. In one example, various features of an input image may be extracted by using different convolutional kernels during the convolution process. In another example, more features may be added to an input image by using different convolutional kernels during the convolution process.

In the embodiments of the present disclosure, the term "convolutional layer" refers to a layer in the convolutional neural network. The convolutional layer is configured to perform a convolution process on an input image to obtain an output image. Optionally, different convolution processes may be performed on the same input image by using different convolutional kernel. Optionally, the convolution process may be performed on different parts of the same input image by using different convolutional kernels. Optionally, the convolution process may be performed on different input images by using different convolutional kernels. For example, a plurality of images are input into a convolutional layer, and the convolution process is performed on the plurality of images by using corresponding convolutional kernels. Optionally, different convolutional kernels are employed according to different conditions of input images.

As shown in FIG. 1, in some embodiments, the hidden layer 200 includes a first hidden convolutional layer 201 and a second hidden convolutional layer 202. Optionally, both the first hidden convolutional layer 201 and the second hidden convolutional layer 202 have a weight $w_{ij}^k$ and a bias $b_i^k$. The weight $w_{ij}^k$ represents a convolutional kernel, and the bias $b_i^k$ is a scalar added to an output of a convolutional layer. k represents a $k^{th}$ input layer of a convolutional neural network, i represents an $i^{th}$ input image among a plurality of input images input into a corresponding input layer, and j represents a $j^{th}$ output among a plurality of outputs obtained by processing a corresponding one of the plurality of input images. k, i and j are positive integers. For example, the first hidden convolutional layer 201 includes a first set of convolutional kernels (e.g., $w_{ij}^1$) and a first set of weights (e.g., $b_i^1$), and the second hidden convolutional layer 202 includes a second set of convolutional kernels (e.g., $w_{ij}^2$) and a second set of weights (e.g., $b_i^2$). In general, each convolutional layer includes hundreds of convolutional kernels. For example, a hidden layer in a deep convolutional neural network includes at least five convolutional layers.

As shown in FIG. 1, the hidden layer 200 of the convolutional neural network further includes a first hidden active layer 204 and a second hidden active layer 205. The first hidden active layer 204 is located between the first hidden convolutional layer 201 and the second hidden convolutional layer 202. The second hidden active layer 205 is sequentially located behind the second hidden convolutional layer 202. Optionally, the active layers (e.g., the first hidden active layer 204 and the second hidden active layer 205) each includes an active function. Nonlinear elements are added to the convolutional neural network by using the active function, so that the convolutional neural network can effectively solve relatively complex problems.

The term "active layer" in the present disclosure refers to a layer in the convolutional neural network. The active layer may perform a nonlinear mapping process on output signals output from the convolutional layer. Various functions may be used in the active layer. Examples of the functions applied to the active layer include, but are not limited to, a rectified linear unit (ReLU) function, a sigmoid function, and a hyperbolic tangent function (e.g., a tanh function). In one example, no active layer is included in the convolutional layer. In another example, the convolutional layer includes an active layer. For example, the first hidden convolutional layer 201 includes the first hidden active layer 204, and the second hidden convolutional layer 202 includes the second hidden active layer 205.

In some embodiments, in the first hidden convolutional layer 201, the first set of convolutional kernels $w_{ij}^1$ and the first set of weights $b_i^1$ are applied to a corresponding one of the four inputs 101a to generate a plurality of outputs from the first hidden convolutional layer 201. The plurality of outputs from the first hidden convolutional layer 201 are processed by the first hidden active layer 204 to generate a plurality of outputs from the first hidden active layer 204.

In some embodiments, in the second hidden convolutional layer 202, the second set of convolutional kernels $w_{ij}^2$ and the second set of weights $b_i^2$ are applied to a corresponding one of the plurality of outputs from the first hidden active layer 204 to generate a plurality of outputs from the second hidden convolutional layer 202. The plurality of outputs from the second hidden convolutional layer 202 are processed by the second hidden active layer 205 to generate a plurality of outputs from the second hidden active layer 205.

In one example, the generation of a corresponding output of the plurality of outputs from the first hidden convolutional layer 201 includes: applying a corresponding convolutional kernel of the first set of convolutional kernels $w_{ij}^1$ to a corresponding input of the four inputs 101a to generate a first hidden intermediate output, and adding a corresponding weight of the first set of weights $b_i^1$ to the intermediate output to generate the corresponding output of the plurality of outputs from the first hidden convolutional layer 201.

In another example, the generation of a corresponding one of the plurality of outputs from the second hidden convolutional layer 202 includes: applying a corresponding one of the second set of convolutional kernels $w_{ij}^2$ to a corresponding one of the plurality of outputs from the first hidden convolutional layer 201 to generate a second hidden intermediate output, and adding a corresponding one of the second set of weights $b_i^2$ to the second hidden intermediate output to generate the corresponding one of the plurality of outputs from the second hidden convolutional layer 202.

For example, the outputs from the first hidden active layer 204 are the three outputs 206 of the hidden layer 200, and the outputs from the second hidden active layer 205 are the two outputs 300a of the output layer 300.

In some embodiments, the convolutional layer is a core layer of the convolutional neural network. In a convolutional layer, a neuron is coupled to some neurons in another convolutional layer which is directly adjacent to the convolutional layer. Optionally, a plurality of convolutional kernels in the convolutional layer are applied to an input image to extract a plurality of features from the input image. One feature may be extracted from the input image through the convolutional layer. Optionally, an initialized convolutional kernel is a random fractional matrix. During a pre-training process of the convolutional neural network, the convolutional kernel obtains a reasonable value through learning.

Optionally, a result obtained by applying the convolutional kernel to an input image is referred to as a feature map. The number of a plurality of feature maps is equal to the number of a plurality of convolutional kernels. A corresponding one of the plurality of feature maps corresponds to a corresponding one of the plurality of convolutional kernels.

Optionally, the corresponding one of the plurality of feature maps includes neurons arranged in an array. The neurons of the corresponding one of the plurality of feature maps share the corresponding one of the plurality of convolutional kernels.

Optionally, the convolutional neural network includes a plurality of convolutional layers. A feature map output from a corresponding one of the plurality of convolutional layers is input into a downstream convolutional layer of the plurality of convolutional layers. The downstream convolutional layer of the plurality of convolutional layers processes the feature map output from the corresponding one of the plurality of convolutional layers, and outputs a downstream feature map of the plurality of feature maps.

In some embodiments, the downsampling layer is located between two adjacent convolutional layers. In one example, a pooling layer is configured to reduce a size of an input image to simplify the complexity of the operation and improving over-fitting phenomena. In another example, the pooling layer may compress features of the input image and extract major features from the input image. Optionally, the pooling layer may reduce a size of a corresponding one of the feature maps and do not change the number of the feature maps. For example, an input image with a size of 12×12 is sampled by a 6×6 filter, and then the 6×6 filter outputs an output image with a size of 2×2. That means that 144 pixels of the input image with the size of 12×12 are divided into four parts, each of the four parts has 36 pixels. After a pooling process is performed by the 6×6 filter on the input image, the 36 pixels in each part are combined into one pixel, so that the generated output image has the size of 2×2.

In the embodiments of the present disclosure, a size of an image (e.g., the feature map, data, or a signal) refers to a width and a height of the image, such as width×height.

In the embodiments of the present disclosure, the term "pooling process" refers to one of downsampling processes. Various pooling processes may be employed. Examples of the suitable pooling process include, but are not limited to, a maximum pooling (max-pooling) process, an average pooling (avg-pooling) process, and a decimation process. In some embodiments, the term "downsampling process" refers to a process of extracting the features from the input image and outputting the output image with a smaller size. The term "upsampling process" in the present disclosure refers to a process of adding more information to the input image and outputting the output image with a larger size.

An embodiment of the present disclosure provides an image processing method applied to a convolutional neural network. The image processing method is particularly suitable for processing a video image for a video call. The image processing method includes: processing an input image with a convolutional neural network to obtain a first output image, with the definition of the first output image being greater than that of the input image.

The term "definition" in the embodiments of the present disclosure refers to the contrast between objects in an image, such as the definition of a contour of image and the definition of related fine shadow patterns in the image. The higher the definition is, the better the perception of the human eye is. For example, the input image is processed with the image processing method provided by the present disclosure (e.g., denoising process and/or deblurring process or resolution enhancement process) to obtain the first output image having the definition higher than that of the input image, so that the first output image subjected to the image processing is sharper than the input image. In one example, the definition may be measured through a mathematical calculation method using a modulation transfer function.

Figure 2:
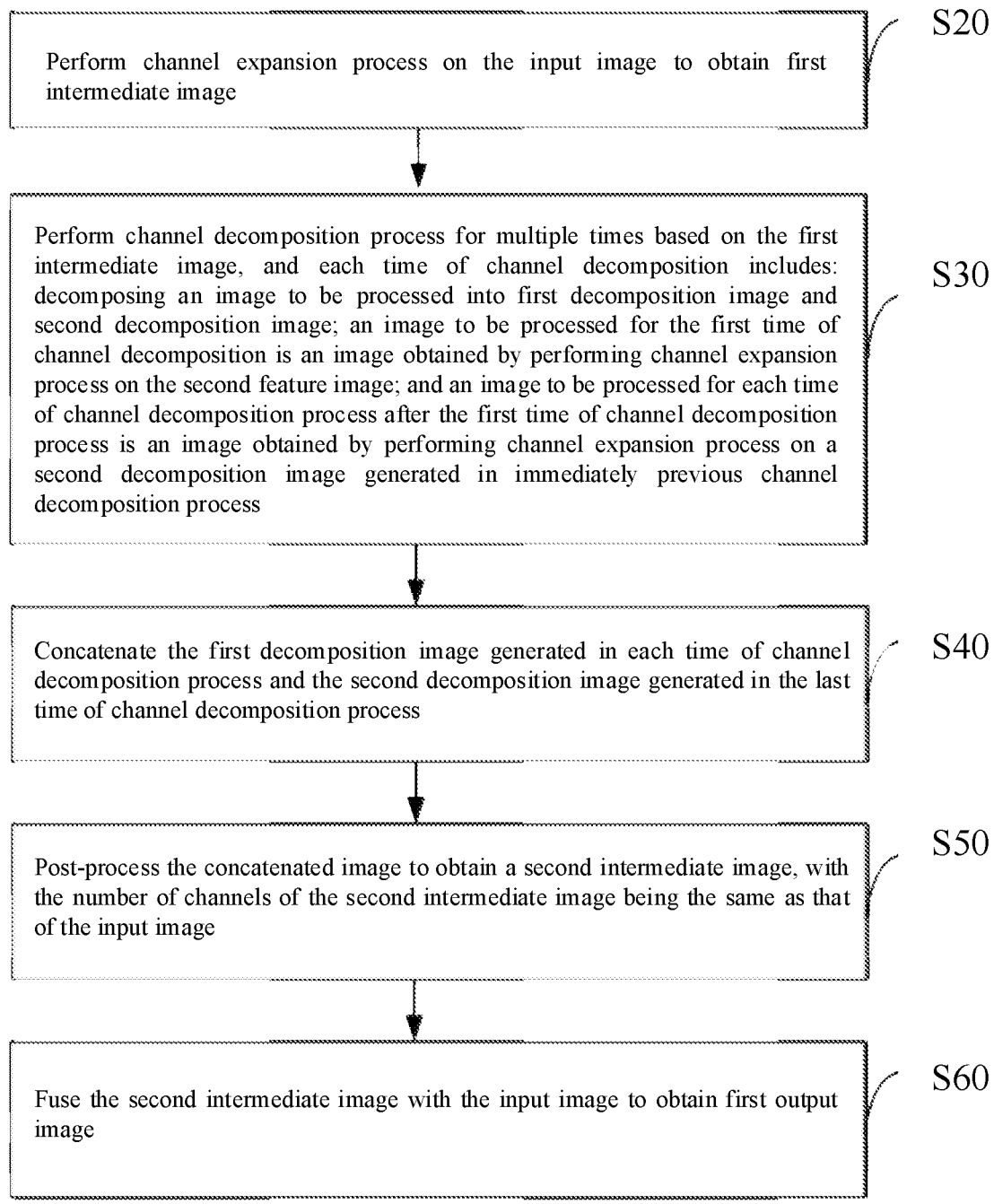
FIG. 2 is a flowchart showing a process of processing an input image with a convolutional neural network to obtain a first output image, according to some embodiments of the present disclosure.

FIG. 2 is a flowchart showing a process of processing an input image with a convolutional neural network to obtain a first output image according to some embodiments of the present disclosure. As shown in FIG. 2, the process of processing the input image with the convolutional neural network to obtain the first output image specifically includes steps S20 to S60.

At step S20, a channel expansion process is performed on the input image to obtain a first intermediate image, and the number of channels of the first intermediate image is greater than the number of channels of the input image.

In the embodiments of the present disclosure, each of the input image, the first intermediate image, and a second to sixth intermediate images, the first output image and a second output image that are mentioned below has a plurality of channels, and an image of each of the channels is a feature map. During the image processing process, each feature map is represented in the form of matrix, a height of the feature map is the number of rows of the matrix corresponding to the feature map, and a width of the feature map is the number of columns of the corresponding matrix. It should be noted that "channel(s) of an image" in the embodiments of the present disclosure represents that each channel of the image corresponds to one feature map, and "size(s) of an image" represent a size of the feature map corresponding to each channel of the image. If an image includes a plurality of channels, the feature map of each of the channels has the same size.

For example, the input image includes an image for a red channel, an image for a green channel, and an image for a blue channel. For example, a step of performing the channel expansion process on the input image includes performing convolution on the input image to obtain the first intermediate image.

In one example, the step S20 may specifically include steps S21 to S22.

At step S21, a feature extraction process is performed on the input image to obtain a third intermediate image; and the number of channels of the third intermediate image is the same as the number of channels of the input image. For example, when the input image includes an image for a red channel, an image for a green channel, and an image for a blue channel, the step of performing the feature extraction process on the input image specifically includes: separately performing feature extraction on the image for the red channel, the image for the green channel and the image for the blue channel respectively to obtain the third intermediate image with three channels. For example, step S10 is performed by a convolutional layer of a convolutional neural network, and a convolutional kernel in the convolutional layer has a size of 3×3.

At step S22, downsampling and channel expansion processes are performed on the third intermediate image to obtain the first intermediate image. A size of the first intermediate image is smaller than a size of the third intermediate image, and the number of channels of the first intermediate image is greater than the size of the third intermediate image.

For example, at the step S22, 2× downsampling is performed, and the number of channels is expanded to 4 times the original number of channels; that is, in the case where the third intermediate image has a size of M×N and the number of channels of the third intermediate image is C, an image of each channel of the first intermediate image has a size of (M/2)×(N/2), and the number of channels of the first intermediate image is C*4. For example, for an image of each channel of the third intermediate image, four pixels in a 2×2 region in the image of each channel of the third intermediate image is taken as one pixel in an image of four channels of the first intermediate image, such that the first intermediate image has twelve channels when the third intermediate image has three channels.

Compared with the third intermediate image, the first intermediate image has a reduced size and the increased number of channels. When the first intermediate image is subsequently processed by the convolutional layer in the convolutional neural network, different channels of the first intermediate image may be processed in parallel, which can increase a processing speed.

At step S30, a channel decomposition process is performed based on the first intermediate image for multiple times. Each time of channel decomposition process includes: decomposing an image to be processed into a first decomposition image and a second decomposition image; and the number of channels of the first decomposition image is smaller than the number of channels of the second decomposition image, and a sum of the number of channels of the first decomposition image and the number of channels of the second decomposition image is equal to the number of channels of the image to be processed.

The channel decomposition process performed on the image to be processed refers to dividing images of a plurality of channels of the image to be processed into two sets of images, with the first set of images taken as images of a plurality of channels of the first decomposition image and the second set of images taken as images of a plurality of channels of the second decomposition image. The first set of images may include images of a plurality of continuous channels of the image to be processed, and the second set of images may include images of a plurality of continuous channels of the image to be processed; or alternatively the first set of images include images of a plurality of discontinuous channels of the image to be processed, and the second set of images include images of a plurality of discontinuous channels of the images to be processed. For example, the image to be processed has 48 channels, the first decomposition image has n1 channels, and the second decomposition image has (48−n1) channels, with n1<48−n1.

An image to be processed for the first time of channel decomposition process is an image obtained by performing the channel expansion process on a second feature image; and an image to be processed for each time of channel decomposition process after the first time of channel decomposition process is an image obtained by performing the channel expansion process on the second decomposition image generated in the immediately previous channel decomposition process. A step of performing the channel expansion process on the first intermediate image may specifically include: performing a convolution process on the first intermediate image to obtain an image with increased channels. For example, the convolution process is performed on the first intermediate image through a convolutional layer including a convolutional kernel with a size of 3×3. Similarly, a step of performing a channel expansion process on the second decomposition image may specifically include: performing a convolution process on the second decomposition image to obtain an image with increased channels. For example, the convolution process is performed on the second decomposition image through a convolutional layer including a convolutional kernel with a size of 3×3.

At step S40, the first decomposition images generated in each time of channel decomposition process and the second decomposition image generated in the last time of channel decomposition process are concatenated to obtain a concatenated image.

The operation of "concatenating" a plurality of decomposition images may refer to concatenating images of all channels of the plurality of decomposition images, such that the number of channels of the concatenated image is equal to a sum of the numbers of channels of the plurality of decomposition images, and images of all channels of the concatenated image are a combination of the images of all the channels of the plurality of decomposition images.

In some examples, the number of times of channel decomposition process is in a range of 2 to 10, so that the processing speed can be increased while the definition of the first output image can be ensured. For example, when the number of times of channel decomposition process is 3, the number of channels of the first decomposition image is 12, the number of channels of the second decomposition image is 36, and the number of channels of the concatenated image is 12*3+36=72.

At step S50, a post-processing process is performed on the concatenated image to obtain a second intermediate image; and the number of channels of the second intermediate image is the same as that of the input image. The post-processing process on the concatenated image may include multiple convolution processes.

At step S60, the second intermediate image and the input image are fused to obtain the first output image.

In some examples, fusing the second intermediate image with the input image may include: stacking the second intermediate image with the input image, that is, adding values of pixels of the second intermediate image to values of pixels of the input image at corresponding positions. When each of the second intermediate image and the input image includes a plurality of channels, images of the channels of the second intermediate image are in one-to-one correspondence with the images of the channels of the input image Fusing the second intermediate image with the input image mainly includes respectively fusing (e.g., stacking) the images of the channels of the second intermediate image and the images of the input image in the corresponding channels.

In the embodiments of the present disclosure, after the input image is processed by the convolutional neural network to obtain the first intermediate image, the channel decomposition process is performed for N times based on the first intermediate image. During each of (N−1) times of channel decomposition processes, the first decomposition image is output, and the second decomposition image is subjected to the channel expansion process for the next channel decomposition process. The first decomposition images generated during each time of channel decomposition process and the second decomposition image generated during the last time of channel decomposition process are concatenated to generate the concatenated image. A post-processing process is performed on the concatenated image, and the post-processed concatenated image is fused with the input image to obtain the first output image. Through the multiple times of channel decomposition, the input information of the first intermediate image can be retained and high-dimensional information can be extracted on a deeper network, so that the integrity and the mobility of the information are fully considered. Moreover, the processing speed can be increased, so that the method can be deployed on mid-end and low-end graphics processing unit (GPU) servers.

In some embodiments, the number of channels of the image to be processed during each time of channel decomposition is the same, which facilitates improving the image processing speed.

In some embodiments, the number of channels of the second decomposition image is 2 to 5 times that of the first decomposition image. For example, the number of channels of the second decomposition image is 3 times the number of channels of the first decomposition image, so that the input information of the first intermediate image can be retained and more high-dimensional information can be extracted from the first intermediate image, which facilitates improving the definition of the first output image. Exemplarily, the first intermediate image has 12 channels, and the convolution process is performed on the first intermediate image through a convolutional layer including a convolutional kernel with a size of 3×3, so as to obtain the image to be processed (having 48 channels) for the first time of channel decomposition process; during the first time of channel decomposition process, the image to be processed is decomposed into a first feature image with 12 channels and a first intermediate image with 36 channels; then, the convolution process is performed on the first intermediate image through a convolutional layer including a convolutional kernel with a size of 3×3 to obtain an image to be processed (having 48 channels) for the second time of channel decomposition process; during the second time of channel decomposition process, the image to be processed is still decomposed into a first feature image with 12 channels and a first intermediate image with 36 channels; and so on.

Figure 3:
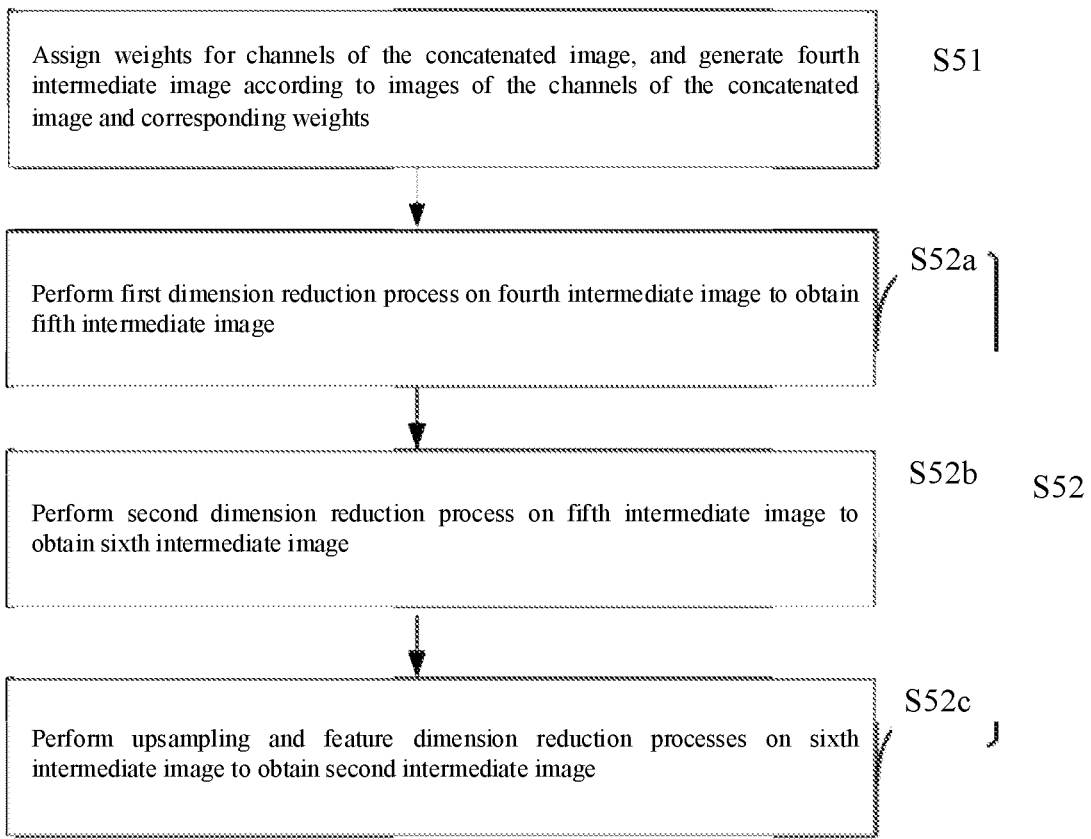
FIG. 3 is a flowchart showing an optional implementation for step S50 according to some embodiments of the present disclosure.

FIG. 3 is a flowchart showing an optional implementation of step S50 according to some embodiments of the present disclosure. As shown in FIG. 3, the step S50 includes step S51 and step S52.

At the step S51, weights are assigned for the channels of the concatenated image, and a fourth intermediate image is generated according to images of the channels of the concatenated image and the corresponding weights. The number of channels of the fourth intermediate image is the same as that of the concatenated image. A larger weight may be assigned for the channels with richer information of the concatenated image, so that the image processing has a strong information bias.

Figure 4:
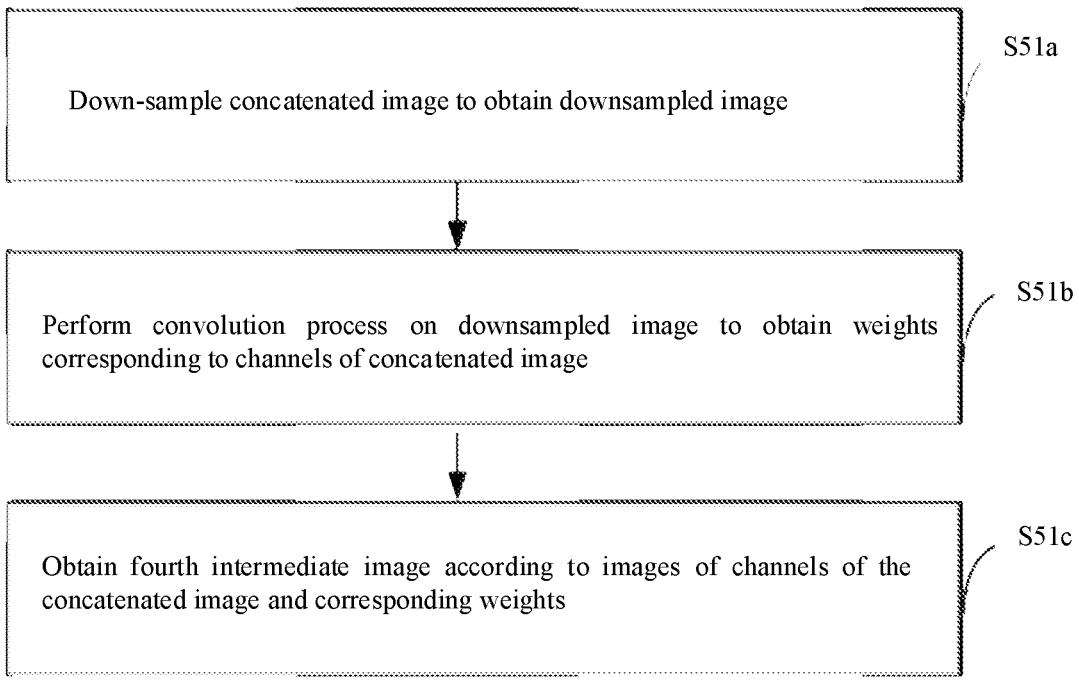
FIG. 4 is a flowchart showing an optional implementation for step S51 according to some embodiments of the present disclosure.
Figure 5:
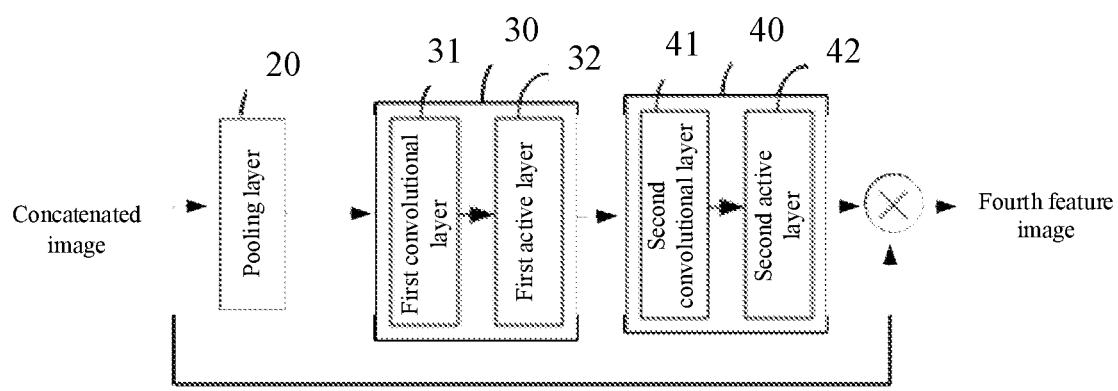
FIG. 5 is a diagram showing a network structure for implementing step S51 according to some embodiments of the present disclosure.

FIG. 4 is a flowchart showing an optional implementation of step S51 according to some embodiments of the present disclosure, and FIG. 5 is a diagram showing a network structure for implementing the step S51 according to some embodiments of the present disclosure. As shown in FIG. 4 and FIG. 5, the step S51 may specifically include steps S51a to S51c.

At the step S51a, a downsampling process is performed on the concatenated image to obtain a downsampled image. The step of the downsampling process on the concatenated image may include: performing a pooling process on the concatenated image; or performing the downsampling process with a standard per-channel downsampler (e.g., bicubic interpolation process); or performing the downsampling process by other means. In some examples of the present disclosure, the step S51a specifically includes: performing the pooling process on the concatenated image with a pooling layer 20; for example, the pooling process on is performed on the concatenated image through an adaptive average pooling layer. A step size used for the pooling process is 1, for example.

At the step S51b, the convolution process is performed on the downsampled image to obtain the weights corresponding to the channels of the concatenated image. The steps S51a and S51b are the process for assigning the weights for the channels of the concatenated image.

The convolution process may be performed on the downsampled image through a first convolutional module 30 and a second convolutional module 40 which are coupled in sequence. The first convolutional module 30 includes a first convolutional layer 31 and a first active layer 32; and the second convolutional module 40 includes a second convolutional layer 41 and a second active layer 42. The number of convolutional kernels in the first convolutional layer 31 is greater than the number of channels of the concatenated image; and the number of convolutional kernels in the second convolutional layer 41 is the same as the number of channels of the concatenated image. The arrangement of the two convolutional modules can prevent too much information from being lost during the convolution of the downsampled image. For example, the concatenated image has 72 channels, the first convolutional layer 31 includes 1024 convolutional kernels with a size of 1×1, and the second convolutional layer 41 includes 72 convolutional kernels with a size of 1×1.

At the step of S51c, the fourth intermediate image is obtained according to the images of the channels of the concatenated image and the corresponding weights. For example, the image of each channel of the concatenated image is multiplied by the corresponding weight to obtain images of a plurality of channels of the fourth intermediate image. Multiplying an image of a certain channel by a corresponding weight specifically includes: multiplying a value of each pixel in the image of the channel by the corresponding weight.

At step S52, a dimension reduction process is performed on the fourth intermediate image to generate the second intermediate image. The number of channels of the second intermediate image is smaller than the number of channels of the fourth intermediate image.

Optionally, the step S52 includes steps S52a to S52c.

At step S52a, a first dimension reduction process is performed on the fourth intermediate image to generate a fifth intermediate image. The number of channels of the fifth intermediate image is smaller than the number of channels of the fourth intermediate image and is the same as the number of channels of the image to be processed. For example, the first dimension reduction process includes performing a convolution process on the fourth intermediate image with a convolutional layer including a convolutional kernel with a size of 1×1.

At step S52b, a second dimension reduction process is performed on the fifth intermediate image to generate a sixth intermediate image. The number of channels of the sixth intermediate image is smaller than the number of channels of the fifth intermediate image and is the same as the number of channels of the first intermediate image. For example, the second dimension reduction process includes performing a convolution process on the fifth intermediate image with a convolutional layer including a convolutional kernel with a size of 3×3.

At step S52c, upsampling and feature dimension reduction processes are performed on the sixth intermediate image to generate the second intermediate image. A size of the second intermediate image is greater than a size of the sixth intermediate image, and the number of channels of the second intermediate image is smaller than the number of channels of the sixth intermediate image.

For example, in the case where the sixth intermediate image has a size of W×H and 12 channels, pixels at the same positions of every 4 channels of the sixth intermediate image are spliced together to form a 2×2 pixel block of one channel of the second intermediate image, such that the sixth intermediate image with 12 channels is adjusted to the second intermediate image with 3 channels, and the second intermediate image has a size of (2×W)×(2×H).

In some embodiments, before the step S20, the image processing method further includes: training an initial convolutional network according to multiple sets of sample images and a loss function to obtain the convolutional neural network, which is a lightweight convolutional neural network.

Each set of samples includes an original sample image and a first sample image corresponding to the original sample image. In some examples, the original sample image is an image extracted from an original video. For example, the original video may be compressed at a certain bit rate (e.g., the compression bit rate is 1 Mbps) to obtain the compressed video, and each frame of image in the compressed video can be taken as the first sample image with noise which is Gaussian noise.

The training process for the initial convolutional network includes performing training by using different sets of sample images for multiple times. Each time of training includes: providing a first sample image for a current convolutional network, so that the current convolutional network outputs a predicted image; and adjusting parameters of the convolutional network to reduce a value of the loss function. The loss function may indicate a difference between the predicted image and the original sample image. In the first time of training, the initial convolutional network is used as the current convolutional network. "Adjusting the parameters of the convolutional network to reduce the value of the loss function" refers to adjusting the parameters of the convolutional network to make a value of the loss function in the next training smaller than the value of the loss function in the current training, or to make the overall trend of the values of the loss functions in the multiple times of training decrease.

For example, the loss functions include a Smooth L1 loss function, and a learning rate of the training is $1e^{-4}$. The loss function Loss is expressed as the following formula:

$$Loss = \begin{cases} 0.5 \ (y - f(x))^2, & |y - f(x)| < 1 \\ |y - f(x)| - 0.5, & y - f(x) < -1 \text{ or } y - f(x) > 1 \end{cases}$$

where y is the original sample image, x is the first sample image, and f(x) is an output result of a current convolutional network based on the first sample image.

Figure 6:
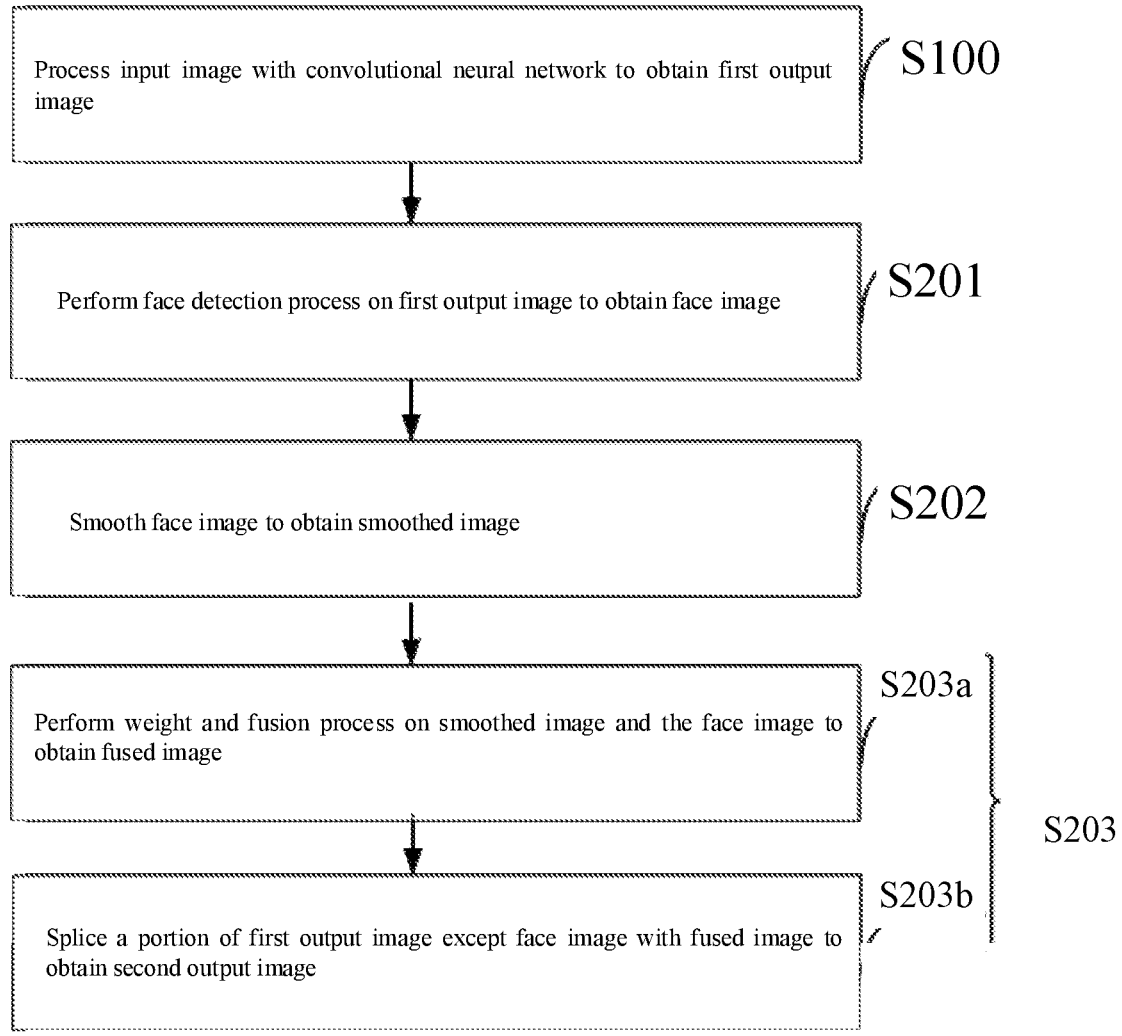
FIG. 6 is flowchart showing another image processing method according to some embodiments of the present disclosure.

FIG. 6 is another flowchart showing an image processing method according to some embodiments of the present disclosure. As shown in FIG. 6, the image processing method includes steps S100 to S203.

At step S100, an input image is processed with a convolutional neural network to obtain a first output image.

The step S100 may include the above steps S20 to S60, which are specifically described above and are not described again herein.

At step S201, a face detection process is performed on the first output image to obtain a face image.

In some embodiments, the step S201 includes: performing multiscale feature extraction on the first output image to obtain feature extraction images with various sizes; and performing the convolution process on each of the feature extraction images to obtain pieces of location information and pieces of category information of a plurality of detection boxes in the first output image. The location information of the detection box includes a horizontal coordinate and a longitudinal coordinate of an upper left corner of the detection box, and a width and a height of the detection box; and the category information of the detection box includes a probability that an image in the detection box is a face image (e.g., the probability that an image in a certain detection box is a face image is 0.9, and the probability that the image in the detection box is not a face image is 0.1). Then, location information of an effective detection box among the plurality of detection boxes is determined according to the pieces of category information of the plurality of detection boxes, with the effective detection box referring to a detection box an image in which is a face image. After the location information of the effective detection box is acquired, the face image in the effective detection box can be acquired. A non-maximum suppression process may be performed on pieces of the category information of the plurality of detection boxes through a non-maximum suppression (NMS) algorithm, so as to determine the location information of the effective detection box among the plurality of detection boxes.

Figure 7:
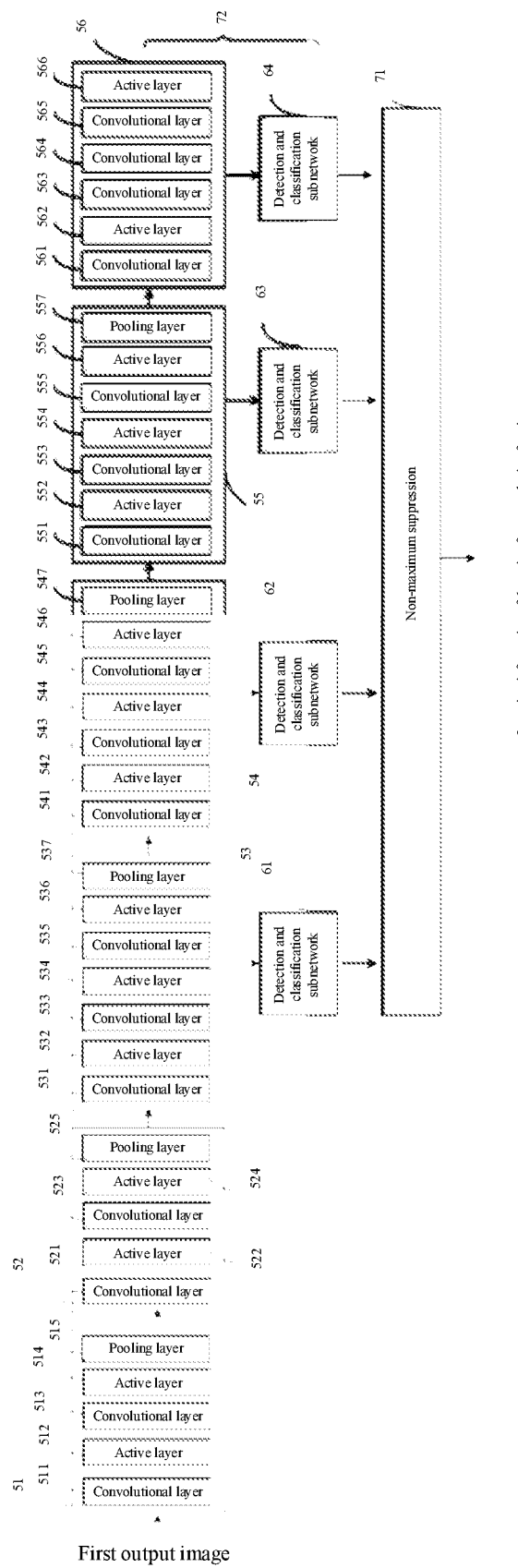
FIG. 7 is a schematic diagram showing a face detection model according to some embodiments of the present disclosure.

FIG. 7 is a schematic diagram showing a face detection model according to some embodiments of the present disclosure. The face detection model includes a detection network 72 and an non-maximum suppression module 71. The detection network 72 is a lightweight convolutional neural network which is simple in structure and can improve an operation speed. As shown in FIG. 7, the detection network 72 includes a plurality of convolutional subnetworks 51 to 56 coupled in sequence and at least two detection and classification subnetworks 61 to 64. Each of the convolutional subnetworks 51 to 56 is configured to perform a feature extraction process on a received image so as to output a feature extraction image, and the feature extraction images output by the convolutional subnetworks 51 to 56 have various sizes.

Each of the detection and classification subnetworks 61 to 64 corresponds to one convolutional subnetwork. The detection and classification subnetworks 61 to 64 are configured to determine the pieces of location information and the pieces of category information of the plurality of detection boxes in the first output image according to the feature extraction images output by the convolutional subnetworks 51 to 56. Different detection and classification subnetworks output the information of the detection boxes with different sizes.

The non-maximum suppression module 71 is configured to determine the location information of the effective detection box.

In some examples, the detection network 72 includes six convolutional subnetworks 51 to 56 and four detection and classification subnetworks 61 to 64. The detection and classification subnetwork 61 corresponds to the convolutional subnetwork 53, the detection and classification subnetwork 62 corresponds to the convolutional subnetwork 54, the detection and classification subnetwork 63 corresponds to the convolutional subnetwork 55, and the detection and classification subnetwork 64 corresponds to the convolutional subnetwork 56.

The convolutional subnetwork 51 includes: a convolutional layer 511, an active layer 512, a convolutional layer 513, an active layer 514, and a pooling layer 515; the convolutional layer 511 has a convolutional kernel with a size of 3×3, and the convolutional layer 513 has a convolutional kernel with a size of 1×1; and the pooling layer 515 has a convolutional kernel with a size of 2×2. The convolutional subnetwork 52 includes: a convolutional layer 521, an active layer 522, a convolutional layer 523, an active layer 524, and a pooling layer 525; the convolutional layer 521 has a convolutional kernel with a size of 3×3, and the convolutional layer 523 has a convolutional kernel with a size of 1×1; and the pooling layer 525 has a convolutional kernel with a size of 2×2.

The convolutional subnetwork 53 includes: a convolutional layer 531, an active layer 532, a convolutional layer 533, an active layer 534, a convolutional layer 535, an active layer 536, and a pooling layer 537; and each of the convolutional layer 531 and the convolutional layer 535 has a convolutional kernel with a size of 3×3, the convolutional layer 533 has a convolutional kernel with a size of 1×1, and the pooling layer 537 has a convolutional kernel with a size of 2×2. The convolutional subnetwork 54 includes: a convolutional layer 541, an active layer 542, a convolutional layer 543, an active layer 544, a convolutional layer 545, an active layer 546, and a pooling layer 547; and each of the convolutional layer 541 and the convolutional layer 545 has a convolutional kernel with a size of 3×3, the convolutional layer 543 has a convolutional kernel with a size of 1×1, and the pooling layer 547 has a convolutional kernel with a size of 2×2. The convolutional subnetwork 55 includes: a convolutional layer 551, an active layer 552, a convolutional layer 553, an active layer 554, a convolutional layer 555, an active layer 556, and a pooling layer 557; and each of the convolutional layer 551 and the convolutional layer 555 has a convolutional kernel with a size of 3×3, the convolutional layer 553 has a convolutional kernel with a size of 1×1, and the pooling layer 557 has a convolutional kernel with a size of 2×2. The convolutional subnetwork 56 includes: a convolutional layer 561, an active layer 562, a convolutional layer 563, an active layer 564, a convolutional layer 565, and an active layer 566; and each of the convolutional layer 561 and the convolutional layer 565 has a convolutional kernel with a size of 3×3, and the convolutional layer 563 has a convolutional kernel with a size of 1×1.

For example, if the first output image has a size of 320×240 and has 3 channels, the image output by the convolutional subnetwork 51 has a size of 160×120 and has 16 channels; the image output by the convolutional subnetwork 52 has a size of is 80×60 and has 16 channels; the image output by the convolutional subnetwork 53 has a size of 40×30 and has 32 channels; the image output by the convolutional subnetwork 54 has a size of 20×15 and has 64 channels; the image output by the convolutional subnetwork 55 has a size of is 10×8 and has 128 channels; and the image output by the convolutional subnetwork 56 has a size of 10×8 and has 128 channels.

At step S202, a smoothing process is performed on the face image to obtain a smoothed image. The smoothing process can make the skin of human face smoother and softer, and improve a visual effect of the human face. It should be noted that the face image is an image of a region where human face is located, while the first output image may include images of other regions, such as a scene image, except for the face image. The face image may be extracted from the first output image at the step 201. Only the face image extracted from the first output image is smoothed at the step S202, and no process is performed on the images of the other regions of the first output image.

In some embodiments, the step S202 includes performing a bilateral filtering process on the face image, with a bilateral filtering formula as follows:

$$g(i, j) = \frac{\sum_{k,l} f(k, l) w(i, j, k, l)}{\sum_{k,l} w(i, j, k, l)}$$

$$w(i, j, k, l) = \exp\left(-\frac{(i-k)^2 + (j-l)^2}{2\sigma_d^2} - \frac{\|f(i, j) - f(k, l)\|^2}{2\sigma_r^2}\right)$$

where $\sigma_d$ and $\sigma_r$ are smoothing parameters, g(i, j) is a value of a pixel in the smoothed image at ordinates (i, j), and f(k, l) is a value of a pixel in the face image at ordinates (k, l); w(i, j, k, l) is a weight; and (k, l) is an ordinate of a pixel within a window which takes the ordinate (i, j) as a center in the face image, and a size of the window may be determined as actual needed, for example, the window has a size of 3×3.

It should be noted that performing the smoothing process on the face image by using the bilateral filtering is only an exemplary method, and other methods may also be used for the smoothing process.

At step S203, a second output image is generated according to the smoothed image and the first output image.

In some embodiments, the step S203 includes steps S203a and S203b.

At step S203a, a weight and fusion process is performed on the smoothed image and the face image to obtain a fused image.

Specifically, the step S203a includes: multiplying the smoothed image by a first weight to obtain a first weighted image; multiplying the face image by a second weight to obtain a second weighted image; and adding the first weighted image to the second weighted image to obtain the fused image. Specifically, the step of multiplying a certain image by a weight includes: multiplying a value of each pixel of the certain image by the weight. Specifically, the step of adding the first weighted image to the second weighted image includes adding a value of a pixel in the first weighted image to a value of a pixel, at a corresponding position, in the second weighted image. For example, a value of a pixel in the first row and the first column in the first weighted image and a value of a pixel in the first row and the first column in the second weighted image are added together to obtain a value of a pixel in the first row and the first column in the fused image.

For example, the weight for the smoothed image is 0.4, and the weight for the face image is 0.6.

At step S203b, a portion of the first output image except the face image is spliced with the fused image to obtain the second output image.

After the steps S202 and S203, the face image is softer while the naturalness of human face can be maintained in the finally output second output image, thereby improving the visual effect.

The present disclosure further provides a computer device which includes a memory having a computer program stored therein, and a processor, and the above image processing method is performed when the computer program is executed by the processor.

The present disclosure further provides a computer-readable storage medium having a computer program stored therein, and the above image processing method is performed when the computer program is executed by a processor.

The above memory and computer-readable storage medium include, but are not limited to, the following readable medium as a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a magnetic or optical data storage, a register, a magnetic disk or a magnetic tape, an optical storage medium such as a compact disc (CD) or a digital versatile disk (DVD), and other non-transitory media. Examples of the processor include, but are not limited to, a general purpose processor, a central processing unit (CPU), a microprocessor, a digital signal processor (DSP), a controller, a microcontroller and a state machine.

It should be understood that the above embodiments are merely exemplary embodiments that are employed to illustrate the principles of the present disclosure, and that the present disclosure is not limited thereto. Various changes and modifications can be made by those of ordinary skill in the art without departing from the spirit and essence of the present disclosure, and should be considered to fall within the protection scope of the present disclosure.

What is claimed is:

1. An image processing method applied to a convolutional neural network, comprising:
    processing an input image with a convolutional neural network to obtain a first output image, with definition of the first output image being greater than definition of the input image;
    wherein processing the input image with the convolutional neural network to obtain the first output image comprises:
    performing a channel expansion process on the input image to obtain a first intermediate image, with a number of channels of the first intermediate image being greater than a number of channels of the input image;
    performing a channel decomposition process for multiple times based on the first intermediate image, wherein each time of channel decomposition process comprises: decomposing an image to be processed into a first decomposition image and a second decomposition image; a number of channels of the first decomposition image is smaller than a number of channels of the second decomposition image, and a sum of the number of channels of the first decomposition image and the number of channels of the second decomposition image is equal to a number of channels of the image to be processed; an image to be processed for the first time of channel decomposition process is an image obtained by performing the channel expansion process on the first intermediate image; and an image to be processed for each time of channel decomposition process after the first time of channel decomposition process is an image obtained by performing the channel expansion process on the second decomposition image generated in an immediately previous channel decomposition process;
    concatenating the first decomposition images generated in each time of channel decomposition process and the second decomposition image generated in the last time of channel decomposition process to obtain a concatenated image;
    performing a post-processing process on the concatenated image to obtain a second intermediate image, with a number of channels of the second intermediate image being the same as the number of channels of the input image; and
    fusing the second intermediate image with the input image to obtain the first output image.

2. The image processing method of claim 1, wherein performing the channel expansion process on the input image to obtain the first intermediate image comprises:
    performing a feature extraction process on the input image to obtain a third intermediate image, with a number of channels of the third intermediate image being the same as the number of channels of the input image; and
    performing downsampling and channel expansion processes on the third intermediate image to obtain the first intermediate image, with a size of the first intermediate image being smaller than a size of the third intermediate image and the number of channels of the first intermediate image being greater than the number of channels of the third intermediate image.

3. The image processing method of claim 1, wherein performing the post-processing process on the concatenated image to obtain the second intermediate image comprises:
    assigning weights for channels of the concatenated image;
    generating a fourth intermediate image according to images of the channels of the concatenated image and corresponding weights, with a number of channels of the fourth intermediate image being the same as a number of channels of the concatenated image; and
    performing a dimension reduction process on the fourth intermediate image to obtain the second intermediate image, with the number of channels of the second intermediate image being smaller than the number of channels of the fourth intermediate image.

4. The image processing method of claim 3, wherein assigning the weights for the channels of the concatenated image comprises:
    performing a down-sampling process on the concatenated image to obtain a downsampled image; and
    performing a dimension reduction process on the downsampled image to obtain the weights corresponding to the channels of the concatenated image.

5. The image processing method of claim 3, wherein performing the dimension reduction process on the fourth intermediate image to obtain the second intermediate image comprises:
    performing a first dimension reduction process on the fourth intermediate image to obtain a fifth intermediate image, with a number of channels of the fifth intermediate image being smaller than the number of channels of the fourth intermediate image;
    performing a second dimension reduction process on the fifth intermediate image to obtain a sixth intermediate image, with a number of channels of the sixth intermediate image being smaller than the number of channels of the fifth intermediate image and the same as the number of channels of the first intermediate image; and
    performing upsampling and feature dimension reduction processes on the sixth intermediate image to obtain the second intermediate image, with a size of the second intermediate image being greater than a size of the sixth intermediate image and the number of channels of the second intermediate image being smaller than the number of channels of the sixth intermediate image.

6. The image processing method of claim 1, wherein the number of channels of the second decomposition image is 2 to 5 times the number of channels of the first decomposition image.

7. The image processing method of claim 1, wherein the number of channels of the image to be processed in each time of channel decomposition process is the same.

8. The image processing method of claim 1, further comprising:
    performing a face detection process on the first output image to obtain a face image;
    performing a smoothing process on the face image to obtain a smoothed image; and
    generating a second output image according to the smoothed image and the first output image.

9. The image processing method of claim 8, wherein performing the smoothing process on the face image comprises: performing a bilateral filtering process on the face image.

10. The image processing method of claim 8, wherein generating the second output image according to the smoothed image and the first output image comprises:
  performing a weighting and fusion process on the smoothed image and the face image to obtain a fused image; and
  splicing a portion of the first output image except the face image with the fused image to obtain the second output image.

11. The image processing method of claim 8, wherein performing the face detection process on the first output image comprises:
  performing a multiscale feature extraction process on the first output image to obtain feature extraction images with various sizes;
  performing a convolution process on each of the feature extraction images to obtain location information and category information of a plurality of detection boxes in the first output image;
  determining location information of an effective detection box of the plurality of detection boxes according to the category information of the plurality of detection boxes; and
  determining the face image enclosed by the effective detection box according to the location information of the effective detection box.

12. The image processing method of claim 1, further comprising:
  training an initial convolutional network according to multiple sets of sample images and a loss function to obtain the convolution neural network;
  wherein the loss function comprises a Smooth L1 loss function.

13. An image processing device, comprising a memory having a computer program stored therein, and a processor, wherein the image processing method of claim 1 is performed when the computer program is executed by the processor.

14. A computer-readable storage medium having a computer program stored therein, wherein the image processing method of claim 1 is performed when the computer program is executed by a processor.

* * * * *